Dec. 28, 1948. J. B. KUCERA 2,457,243
VEHICLE SPRING
Filed Feb. 21, 1945

INVENTOR.
JOSEPH B. KUCERA
Rudolph L. Lowell
atty

Patented Dec. 28, 1948

2,457,243

UNITED STATES PATENT OFFICE 2,457,243

VEHICLE SPRING

Joseph B. Kucera, Traer, Iowa

Application February 21, 1945, Serial No. 578,996

3 Claims. (Cl. 267—29)

This invention relates generally to vehicle springs and in particular to an automobile body supporting spring assembly.

The use in present day automobiles of an upwardly bowed semi-elliptical spring for supporting the automobile body is well known and is generally very satisfactory in operation. However, a spring of this type on becoming fatigued, as a result of being overloaded or normally used over a period of time, tends to straighten or flatten out. When the spring is fatigued its flexing action or movement is appreciably reduced so that the automobile rides rough. Also the load carrying capacity of the automobile is appreciably lowered due to the fact that the vehicle body will sag under relatively light loads on the car axle. When a spring becomes fatigued, therefore, it is usually necessary to replace the spring with a new one.

It is an object of this invention, therefore, to provide an improved vehicle body supporting spring assembly.

A further object of this invention is to provide a vehicle body supporting spring of semi-elliptical type which is capable of operating efficiently over prolonged periods of time with rough usage.

Yet another object of this invention is to provide a vehicle body supporting spring of semi-elliptical type which has a shock absorbing or stabilizing action against excessive up and down flexing movement.

Another object of this invention is to provide an attachment for a semi-elliptical spring adapted to support the spring against flattening out and to stabilize the flexing movement of the spring in both directions.

A feature of this invention is found in the provision for a semi-elliptical spring movably supported at its ends for flexing movement, of a pair of supporting arms arranged at opposite ends of the spring and extended inwardly of the spring toward each other. The arms are connected with the spring ends for up and down movement in response to the flexing of the spring. A tension spring connected between the inner ends of the arms normally acts to hold the semi-elliptical spring against flattening out, and by virtue of its connection between the inner ends of the arms to snub or stabilize the flexing action of the semi-elliptical spring in both directions of its flexing movement.

Further objects, features and advantages of this invention will become apparent from the following description when taken in connection with the accompanying drawings in which.

Figure 1:
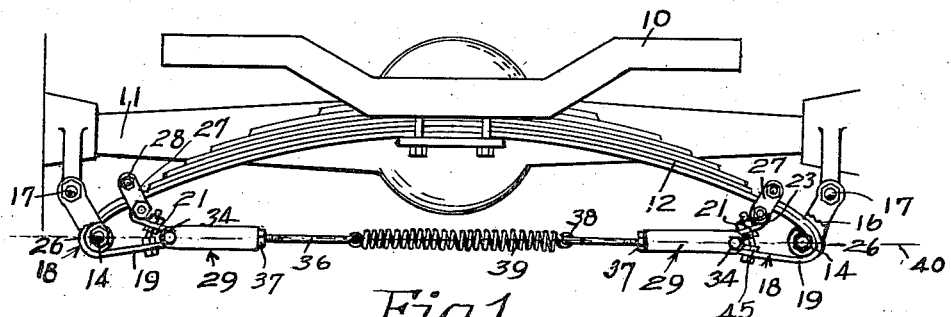
Fig. 1 is a side elevational view of a semi-elliptical spring for supporting the rear end of an automobile shown in assembly relation with an automobile and with the spring stabilizing device of this invention.

With reference to the drawings there is illustrated in Fig. 1 a rear portion of an automobile including a chassis 10, a rear axle 11 and a spring 12 of semi-elliptical type, bowed upwardly and secured at the top thereof to the chassis 10 for supporting the vehicle body. The spring 12 is arranged to the rear side of the axle 11 and is movably supported at its ends 14 for up and down flexing movement by means including the usual spring shackles 16, each of which is pivotally supported at one end 17 from the rear axle 11 and pivotally connected at its other end to a corresponding spring end 14. The spring assembly thus far described is well known and in general use in Ford and Mercury automobiles.

The semi-elliptical spring 12 on becoming fatigued tends to flatten out under the weight of the vehicle body whereby the body sags or approaches a position adjacent to the top of the rear axle 11. Further, the closer the spring 12 approaches a flat position the less resilience and flexing action it provides for absorbing usual road shocks. Also the strength of the spring 12 is appreciably reduced so that as it becomes fatigued less load is required to deflect the spring downwardly a given amount.

The present invention provides an attachable device for a semi-elliptical spring adapted to strengthen and improve the operation of a fatigued spring, or the device can be used with a new spring to fortify such spring against a fatigued condition concurrently with providing a shock absorbing action for the spring. The attachment includes a pair of bracket members 18 (Figs. 1 and 6) of a similar construction so that only one of the brackets will be referred to in detail in the following description.

The bracket 18 is integrally formed from a single length of strip or bar metal stock and bent into a substantially triangular shape having a base 19 and sides 21 and 22. The base 19 is connected with the sides 21 and 22 by arcuate portions 33 and 26, respectively. The adjacent ends of the sides 21 and 22 are in a spaced relation, with the free end of the side 21 terminating in a loop 24, and the free end of the side 22 in a loop 23. The bracket 18 is assembled about an end 14 of the spring 12 and between a pair of shackles 16, as clearly illustrated in Fig. 3, with the spring end 14 received within the curved portion 26 and the bracket side 22 superposed along a portion of the top of the spring 12. This assembly is accomplished by virtue of the spaced relation between the bracket loops 23 and 24 whereby the bracket is slipped over a spring end to receive such end therein.

With the bracket 18 in this position the loops 23 and 24 are drawn together against opposite sides of the spring 12 by means including a pair of connecting members 27 arranged at opposite sides of the spring 12. A connecting member 27 is formed with end openings adapted for alignment with corresponding loops 23 and 24. With the openings in the connecting members 27 in aligned positions with the loops 23 and 24 bolts 28 are inserted through the connecting members and the loops 23 and 24 for securing the bracket 18 to the spring 12. It is thus seen that the bracket is readily assembled with the semi-elliptical spring 12, without in any way interfering with the original assembly of this spring in the vehicle, by merely inserting the bracket side 22 between the spring shackles 16 and then clamping the bracket about a spring end 14 by the connecting members 27 and bolts 28. With the bracket 18 thus secured to a spring end 14 the side 19 of the bracket constitutes an arm which is substantially rigid with the spring 12 for movement up and down in response to the flexing movement of the spring 12.

Figures 2, 3, 5:
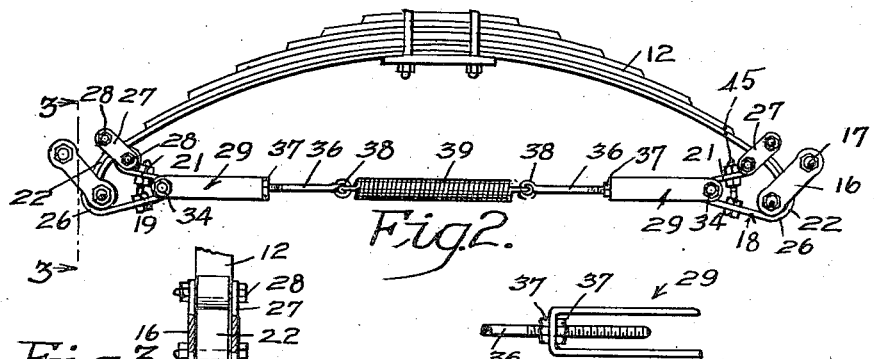
Fig. 2 is illustrated similarly to Fig. 1 and shows the semi-elliptical spring flexed in an upward direction.
Fig. 3 is a sectional view taken on the line 3—3 in Fig. 2.
Fig. 5 is a fragmentary plan detail view as seen on the line 5—5 in Fig. 4.
Figure 7:
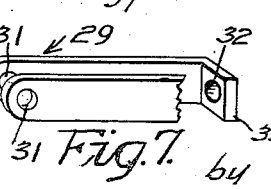
Fig. 7 is a detail perspective view, with certain parts broken away, of a yoke adapted for pivotal connection with the bracket shown in Fig. 6.

The bracket 18 is pivotally connected with a yoke or U-shaped link 29 (Fig. 7) having aligned openings 31 adjacent the free ends of its leg portions. The base or connecting portion 35 of the U member 29 is formed with an opening 32. The legs of the member 29 are arranged in a straddling relation with the rounded portion 33 of the bracket 18 and a bolt 34 is inserted through the openings 31 and supported within the curved portion 33 to pivotally connect the link 29 with the bracket 18. As shown in Fig. 5 an eye bolt 36 is extended through the opening 32 and is locked in an adjusted position by locking nuts 37 engageable with opposite sides of the link portion 35. The eye portion 38 of the bolt 36 is connected with one end of a tension spring 39.

From a consideration of Fig. 1, therefore, it is seen that the arms or side portions 19 of the oppositely arranged brackets 18 are extended toward each other inwardly of the spring 12, with the tension spring 39 being connected between the eye portions 38 of the bolts 36.

With the attachable device of this invention assembled with the spring 12 the tension of the spring 39 is adjusted to exert a desired pressure inwardly on the spring ends 14 by manipulation of the nuts 37 on an eye bolt 36. For a normal support of the vehicle body on the spring 12 it is contemplated that this adjustment provide for the axis of the spring 39, the axes of the bolts 34, and axes of the pivotal supports for the spring ends 14 being in a common plane indicated at 40 in Fig. 1.

In the operation of the spring assembly assume the load of the vehicle body to be temporarily lifted from the spring 12 as occurs, when the vehicle strikes a bump or the like. With the load thus temporarily removed the spring 12 flexes upwardly, as illustrated in Fig. 2, whereby the shackles 16 are pivotally moved inwardly toward each other. Concurrently with this inward pivotal movement of the shackles 16 the tension in the spring 39 is reduced by virtue of the eye portions 38 being moved inwardly toward each other in response to the inward movement of the spring ends 14, and the inner ends of the portions 19 being moved upwardly by the movement of the brackets 18 in respose to the change in the curvature of the semi-elliptical spring 12. However, even though the tension of the spring 39 is reduced, a pressure is retained in the spring 39 tending to pull the brackets 18 and in turn the spring ends 14 toward each other. This action of the spring 39 exerts a pull on the inner ends of the bracket sides 19 tending to move the sides 19 back to their normal positions shown in Fig. 1. Since the sides 19 are integral with the bracket sides 22 the action of the spring 39 to return the sides 19 to their normal positions results in a pressure being applied on the sides 22 acting to hold the spring 12 against upward flexing movement. Thus although the spring 39, at its normal position shown in Fig. 1, acts through the axes of the pivotal supports of the spring ends 14, by virtue of the connection of the spring with the inner ends of the bracket sides 19 it operates to snub or hold the spring 12 against upward flexing movement, rather than to draw the spring ends 14 inwardly toward each other to aid the upward movement of the spring 12.

Figures 4, 8, 9:
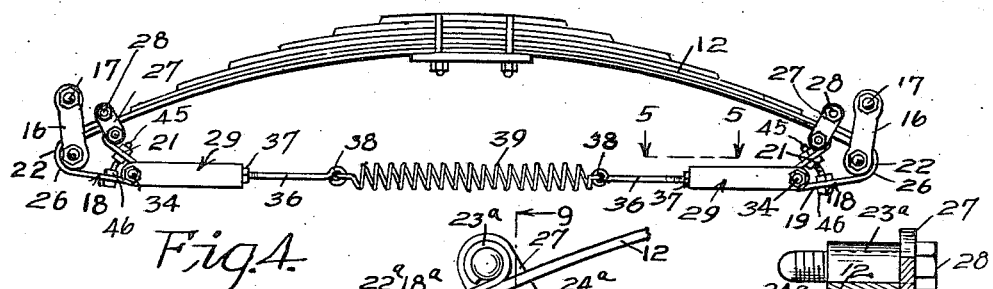
Fig. 4 is illustrated similarly to Fig. 1 and shows the semi-elliptical spring flexed in a downward direction.
Fig. 8 is a modified form of bracket used in the device of this invention shown partly assembled with a semi-elliptical spring.
Fig. 9 is a sectional view taken on the line 9—9 in Fig. 8.

When the load on the spring 12 is increased so that it is flexed in a downward direction, as illustrated in Fig 4, the shackles 16 are pivotally moved away from each other concurrently with a downward movement of the inner ends of the bracket sides 19, provided by the change in curvature of the spring 12, whereby the pressure exerted by the spring 39 is increased. This increased pressure in the spring 39 acts on the bracket sides or arms 19 to urge the sides 19 toward their normal positions shown in Fig. 1 whereby a pressure is applied on the spring ends 14 to hold them against spreading apart from each other, concurrently with the application of a pressure on the bracket sides 22 to counter the downward flexing movement of the spring 12.

It is seen, therefore, that the assembly of the tension spring 39 with the brackets 18 on the semi-elliptical spring 12 not only provides for the application of a pressure inwardly of the spring ends 14 to support the spring 12 in an upwardly bowed position, but also serves to stabilize the spring 12 against excessive upward and downward flexing movement. As a result the attachment of this invention is not only applicable to its use with semi-elliptical springs which are in a fatigued condition, but can also be applied to new semi-elliptical and elliptical springs, or incorporated as a permanent part of such new springs, to act both as a stabilizer or shock absorber for such springs, and as a means for supplementing and retaining the strength of the springs for a longer period of time than would be possible by the use of a semi-elliptical spring alone.

Figure 6:
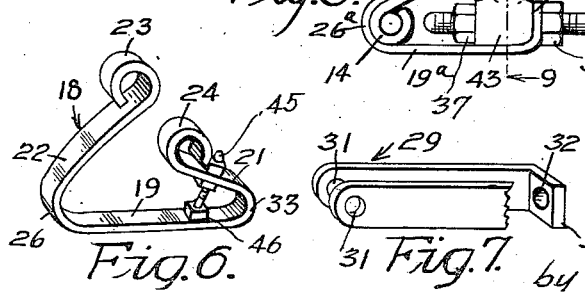
Fig. 6 is a detail perspective view of a bracket forming part of the stabilizing device of this invention.

Although in most instances an adjustment of the pressure of spring 39 to normally position the axis of the spring 39, axes of the bolts 34 and axes of the pivotal supports for the spring ends in the common plane 40 will provide for a very satisfactory spring stabilizing action, it may be desirable at times to vary this stabilizing action by moving the axes of the bolts 34, to one side or the other, of the plane 40. This is accomplished by the provision of an adjusting bolt 45 extended through the bracket sides 19 and 21 across the corner 33 (Figs. 1 and 6). Adjustment of the bolt 45, by the manipulation of the nuts 46, takes place after a bracket 18 is in assembly relation with a corresponding spring end 14. As a result on manipulation of the nuts 46 the bracket side 19 is moved relative to the bracket side 21 to in turn move a bolt 34 relative to the plane 40. By virtue of this movement of the bolt 34 the pressure of the spring 39 acting on the brackets 18, and in turn on the spring 12, is varied. In other words assume the bracket sides 19 to be bent upwardly from their positions shown in Fig. 1 so that the axes of the bolts 34 are above the plane 40. On an upward flexing of the spring 12, the pressure of the spring 39 will be reduced relative to the pressure exerted thereby when the bracket sides 19 are initially in their positions shown in Fig. 1.

As above explained the bracket sides 19 constitute inwardly extended arms from the spring ends 14 of a fixed length, and with only the pressure of the tension spring 39 being adjustable to retain the semi-elliptical spring 12 in a normal position, and to vary the stabilizing or snubbing action on the spring. Since the stabilizing action is affected by both the length of the bracket sides 19 and the tension of the spring 39 it may be desirable, in some instances of application of the device, to provide for the length of the sides 19 being variable. This condition is accomplished by the modified form of the invention shown in Figs. 8 and 9, wherein like numerals designate corresponding parts in the remaining figures.

Referring to Figs. 8 and 9 the bracket 18a is of a substantially U shape having its sides or legs 19a and 22a connected by an arcuate portion 26a. The free end of the side 22a terminates in a loop 23a and the free end of the side 19a in a laterally bent portion 42. A block or bearing member 43 is welded or otherwise secured to the side 19a and the portion 42, with the block and the bent portion 42 having a continuous opening therethrough for receiving an eye bolt 36a. Integrally formed with the block 43 and projected from its upper side, as viewed in Fig. 8, is a loop member 24a, which is in a spaced relation with the loop 23a.

The bracket 18a is assembled with the spring 12 in all ways similar to the assembly of the spring with the bracket 18. With the bracket 18a secured to the spring 12, by the connecting members 27 and bolts 28, the spring 39 is connected between the eye bolts 36a. The block member 43 is of a length to support the eye bolt 36a therein against rocking movement, with the bolt being adjustably extended from the block and maintained in an adjusted position by manipulation of the locking nuts 37.

As clearly appears in Fig. 8 the bolt 36a thus constitutes a rigid extension of the bracket side 19a so that adjustment of the bolt 36a varies the effective leverage arm through which the spring 39 acts on the spring 12, concurrently with an adjustment in the tension of the spring 39. Since the operation of the modified form shown in Figs. 8 and 9 is similar to the operation of the invention above described in connection with Figs. 1, 2 and 4, a further description of such operation is believed to be unnecessary.

Although the invention is illustrated as being an attachment for a vehicle body supporting spring of a semi-elliptical type it is to be understood that it can be combined with such spring as a complete assembly by merely forming the arms 19 of the bracket 18 as an integral part or extension of a spring end 14. It is to be understood also that although the invention has been described with respect to a preferred embodiment thereof that it is not to be so limited since changes and modifications can be made therein which are within the full intended scope of this invention as defined by the appended claims.

I claim:

1. A spring assembly comprising a semi-elliptical spring, pivot means supporting said spring at its opposite ends for flexing movement, a pair of bracket members at the ends of said spring, with said bracket members being integrally formed with hook portions extended about said spring ends, and arm portions projected inwardly from said spring ends opposite the concave side of said spring, means securing said hook portions against the convex side of said spring ends such that the inner ends of said arm portions are movable up and down relative to said pivot means in response to a change in the curvature of the spring at said spring ends, and a coil spring connected under tension between the inner ends of said arm portions.

2. A snubbing attachment for a vehicle spring of semi-elliptical type movably supported at its ends for flexing movement comprising, a pair of bracket members integrally formed with first portions adapted to be arranged about said spring ends, and second portions extended inwardly of said spring ends, opposite the concave side of said spring, when said first portions are thus arranged, means connecting said first portions and said second portions with said spring at positions spaced inwardly from the ends thereof, such that the inner ends of said second portions are movable up and down in response to a change in the curvature of the spring at said spring ends, and tension means connected between the inner ends of said second portions.

3. A snubbing attachment for a vehicle spring of semi-elliptical type movably supported at the ends thereof for flexing movement comprising, a pair of bracket members adapted to be secured about the ends of said spring for movement with the spring on flexing movement thereof, arm members integral with said brackets and projected inwardly from said spring ends opposite the concave side of said spring, with the inner ends of said arm members being movable up and down in response to a flexing movement of the spring, and a coil spring connected under tension between the inner ends of said arm members.

JOSEPH B. KUCERA.

REFERENCES CITED

The following references are of record in the file of this patent:

UNITED STATES PATENTS

| Number | Name | Date |
|---|---|---|
| 246,479 | Doble | Aug. 30, 1881 |
| 1,038,446 | Schoen | Sept. 10, 1912 |
| 1,124,964 | Smith | Jan. 12, 1915 |
| 1,223,850 | Bratlie | Apr. 24, 1917 |
| 1,318,361 | Davis | Oct. 14, 1919 |
| 1,753,099 | Turner | Apr. 1, 1930 |
| 1,791,661 | Cunningham | Feb. 10, 1931 |